US009590748B2

(12) United States Patent
Yao et al.

(10) Patent No.: US 9,590,748 B2
(45) Date of Patent: Mar. 7, 2017

(54) METHODS FOR FACILITATING MEASUREMENT AT TERMINAL DEVICE AND ASSOCIATED RADIO BASE STATION AND TERMINAL DEVICE

(71) Applicant: Telefonaktiebolaget L M Ericsson (publ), Stockholm (SE)

(72) Inventors: Yong Yao, Nanjing (CN); Angelo Centonza, Winchester (GB)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 154 days.

(21) Appl. No.: 14/430,165

(22) PCT Filed: Jan. 29, 2015

(86) PCT No.: PCT/CN2015/071827
§ 371 (c)(1),
(2) Date: Mar. 20, 2015

(87) PCT Pub. No.: WO2016/119166
PCT Pub. Date: Aug. 4, 2016

(65) Prior Publication Data
US 2016/0344485 A1   Nov. 24, 2016

(51) Int. Cl.
*H04W 24/00*     (2009.01)
*H04B 17/30*     (2015.01)
(Continued)

(52) U.S. Cl.
CPC ............ *H04B 17/30* (2015.01); *H04W 24/10* (2013.01); *H04W 8/00* (2013.01)

(58) Field of Classification Search
CPC ......... H04W 24/00–24/10; H04W 8/00; H04B 17/30
(Continued)

(56) References Cited

U.S. PATENT DOCUMENTS

2004/0203459 A1   10/2004  Borras-Chia et al.
2007/0293233 A1*  12/2007  Inoue .................... H04L 1/0026
                                                     455/450
(Continued)

FOREIGN PATENT DOCUMENTS

CN        101026397 A      8/2007
CN        104219690 A     12/2014
(Continued)

OTHER PUBLICATIONS

International Search Report and Written Opinion for Application No. PCT/CN2015/071827, mailed Nov. 2, 2015, 12 pages.
(Continued)

*Primary Examiner* — Afsar M Qureshi
(74) *Attorney, Agent, or Firm* — Nicholson De Vos Webster & Elliott LLP

(57) ABSTRACT

Methods in a Radio Base Station (RBS) and in a terminal device for facilitating measurement at the terminal device are described. The method in the RBS comprises classifying frequency objects to be measured for a measurement task into a number of frequency object groups assigned with respective frequency measurement weights for determining measurement opportunities for the frequency objects; sending to the terminal device a first indication indicating the classification of the frequency objects into the frequency object groups. The method in the terminal device comprises receiving, from a RBS, a first indication indicating a classification of frequency objects to be measured for a measurement task into a number of frequency object groups assigned with respective frequency measurement weights; determining measurement opportunities for the frequency objects of the measurement task based on the frequency measurement weights.

34 Claims, 8 Drawing Sheets

(51) Int. Cl.
*H04W 24/10* (2009.01)
*H04W 8/00* (2009.01)

(58) Field of Classification Search
USPC .................................................. 370/252–254
See application file for complete search history.

(56) References Cited

U.S. PATENT DOCUMENTS

| | | | |
|---|---|---|---|
| 2012/0178439 A1* | 7/2012 | Vashi ................... | H04L 1/1887 455/424 |
| 2012/0244903 A1* | 9/2012 | Fong ....................... | H04W 8/20 455/517 |
| 2013/0115970 A1* | 5/2013 | Hapsari ................ | H04W 24/02 455/456.1 |
| 2015/0189568 A1* | 7/2015 | Stanze ............... | H04W 36/0077 370/331 |
| 2015/0264592 A1* | 9/2015 | Novlan ............... | H04L 27/2601 370/252 |
| 2016/0192229 A1* | 6/2016 | Liu ....................... | H04L 1/0026 455/423 |
| 2016/0212645 A1* | 7/2016 | Uemura ................ | H04W 24/08 |
| 2016/0219450 A1* | 7/2016 | Wakabayashi ........ | H04L 5/0053 |

FOREIGN PATENT DOCUMENTS

| | | | | |
|---|---|---|---|---|
| DE | WO 2010009999 A1 * | 1/2010 | ........ | H04W 72/1231 |
| EP | 2 148 546 A1 | 1/2010 | | |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, (Jun. 2014), pp. 1-365.

* cited by examiner

METHODS FOR FACILITATING MEASUREMENT AT TERMINAL DEVICE AND ASSOCIATED RADIO BASE STATION AND TERMINAL DEVICE

CROSS-REFERENCE TO RELATED APPLICATIONS

This application is a National stage of International Application No. PCT/CN2015/071827, filed Jan. 29, 2015, which is hereby incorporated by reference.

TECHNICAL FIELD

The present disclosure generally relates to the technical field of wireless communications, and particularly, to a method in a Radio Base Station (RBS) for facilitating measurement at a terminal device, a method in a terminal device for facilitating measurement at the terminal device and the associated RBS and terminal device.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In current wireless networks, such as those standardized by the $3^{rd}$ Generation Partnership Project (3GPP), a terminal device (known as user equipment (UE) in the 3GPP context) determines, by itself, measurement opportunities for frequency/cell objects associated with measurement tasks and reports the measured results to the RBS (known as eNodeB in the 3GPP context) which assigned the measurement tasks enabling corresponding features.

This may undesirably leads to inefficient use of measurement resources, because for example some of the frequency/cell objects associated with a measurement task may be measured preferentially over the other objects to better satisfy the measurement task/feature's requirements for Quality of Service (QoS) and/or Key Performance Index (KPI) while the UE may by itself decide to give priority to the other objects. Further, the frequency/cell objects associated with a measurement task, which has more strict QoS and/or KPI requirements, may be measured preferentially while the UE may by itself decide to give priority to frequency/cell objects associated with another measurement task.

SUMMARY

In view of the foregoing, an object of the present disclosure is to overcome at least one of the drawbacks of the existing approach of determining, by the UE itself, measurement opportunities for frequency/cell objects associated with measurement tasks.

To achieve this object, according to a first aspect of the present disclosure, there is provided a method in an RBS for facilitating measurement at a terminal device. The method comprises classifying frequency objects to be measured for a measurement task into a number of frequency object groups. The frequency object groups are assigned with respective frequency measurement weights for determining measurement opportunities for the frequency objects. A first indication is sent to the terminal device, indicating the classification of the frequency objects into the frequency object groups.

According to a second aspect of the present disclosure, there is provided a method in a terminal device for facilitating measurement at the terminal device. The method comprises receiving, from an RBS, a first indication indicating a classification of frequency objects to be measured for a measurement task into a number of frequency object groups. The frequency object groups are assigned with respective frequency measurement weights. Measurement opportunities for the frequency objects of the measurement task are determined based on the frequency measurement weights.

With the proposed method in the RBS, it is possible for the RBS to perform intra-task coordination by classifying frequency objects associated with a measurement task into a number of frequency object groups, which are assigned with respective frequency measurement weights for determining frequency object measurement opportunities, according to the task/feature's QoS and/or KPI requirements.

With the proposed method in the terminal device, the terminal device is able to determine measurement opportunities for the frequency objects based on the RBS's grouping strategy made according to task/feature's requirements. As a result, the task/feature's requirements can be better satisfied and the usage efficiency of measurement resources can be improved.

In an embodiment, the method in the RBS may further comprise determining that the measurement task preempts one or more old measurement tasks. The frequency object group of the measurement task which is assigned with the highest frequency measurement weight is further assigned with a preemption weight for determining measurement opportunities for the frequency objects of the measurement task and the old measurement tasks. A third indication is sent to the terminal device, indicating the preemption of the old measurement tasks by the measurement task.

In this manner, it is possible for the RBS to perform inter-task coordination by providing extra measurement opportunity for the preferred frequency object group of a new measurement task at the cost of reduced measurement opportunities for some of all of frequency object groups of old measurement tasks according to the tasks/features' QoS and/or KPI requirements.

Correspondingly, the method in the terminal device may further comprise receiving from the RBS a third indication indicating a preemption of one or more frequency object groups of one or more old measurement tasks by the frequency object group of the measurement task which is assigned with the highest frequency measurement weight. The frequency object group of the measurement task is further assigned with a preemption weight. The measurement opportunities for the frequency objects of the measurement task and the old measurement tasks may be determined further based on the preemption weight.

Being notified of the preemption of one or more old measurement tasks by a new measurement task, the terminal device is able to determine measurement opportunities for frequency objects of the new measurement task and the old measurement tasks further based on the RBS's preemption strategy made according to tasks/features' requirements. As a result, the tasks/features' requirements can be better guaranteed and the usage efficiency of measurement resources can be further improved.

According to a third aspect of the present disclosure, there is provided an RBS comprising a grouping section and a transmitting section. The grouping section is configured to classify frequency objects to be measured for a measurement task into a number of frequency object groups. The frequency object groups are assigned with respective frequency measurement weights for determining measurement opportunities for the frequency objects. The transmitting section is configured to send to the terminal device a first indication indicating the classification of the frequency objects into the frequency object groups.

In an embodiment, the RBS may further comprise a preemption determining section, which is configured to determine that the measurement task preempts one or more old measurement tasks. The frequency object group of the measurement task which is assigned with the highest frequency measurement weight is further assigned with a preemption weight for determining measurement opportunities for the frequency objects of the measurement task and the old measurement tasks. The transmitting section may be further configured to send to the terminal device a third indication indicating the preemption of the old measurement tasks by the measurement task.

According to a fourth aspect of the present disclosure, there is provided a terminal device comprising a receiving section and a measurement opportunity determining section. The receiving section is configured to receive, from an RBS, a first indication indicating a classification of frequency objects to be measured for a measurement task into a number of frequency object groups. The frequency object groups are assigned with respective frequency measurement weights. The measurement opportunity determining section is configured to determine measurement opportunities for the frequency objects of the measurement task based on the frequency measurement weights.

In an embodiment, the receiving section may be further configured to receive from the RBS a third indication indicating a preemption of one or more frequency object groups of one or more old measurement tasks by the frequency object group of the measurement task which is assigned with the highest frequency measurement weight. The frequency object group of the measurement task is further assigned with a preemption weight. The measurement opportunity determining section may be configured to determine the measurement opportunities for the frequency objects of the measurement task further based on the preemption weight.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figure 1:
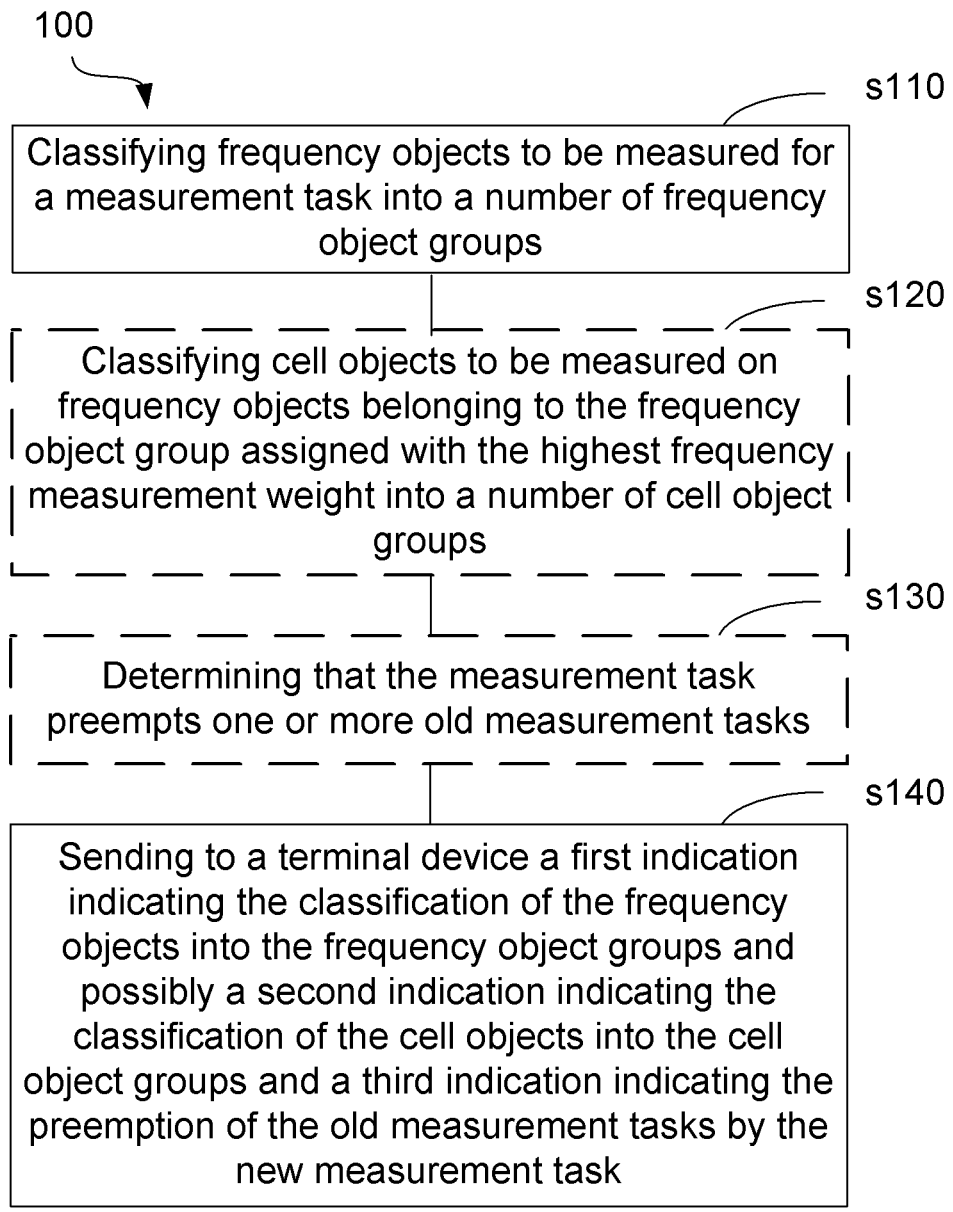
FIG. 1 is a flowchart illustrating a method in an RBS for facilitating measurement at a terminal device according to the present disclosure.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, application specific integrated circuits (ASICs), programmable logic arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to ASIC and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "radio base station (RBS)" and "terminal device" as used herein should be understood in a broad sense. Specifically, the RBS should be understood to encompass a legacy base station in a Second Generation (2G) network, a NodeB in a Third Generation (3G) network, an evolved NodeB in an evolved 3G network, an access point in a Wireless Local Area Network (WLAN), and the like. The terminal device should be understood to encompass a mobile telephone, a smartphone, a wireless-enabled tablet or personal computer, a wireless machine-to-machine unit, and the like.

FIG. 1 schematically shows a method 100 in an RBS for facilitating measurement at a terminal device according to the present disclosure.

As illustrated, initially, frequency objects to be measured for a measurement task are classified into a number of frequency object groups at step s110. The frequency object groups are assigned with respective frequency measurement weights for determining measurement opportunities for the frequency objects. Then, a first indication is sent to the terminal device at step s140, indicating the classification of the frequency objects into the frequency object groups.

By way of illustration rather than limitation, the frequency object groups may comprise a preferred frequency object group, a less preferred frequency object group and a normal frequency object group. The preferred frequency object group has a higher frequency measurement weight than the less preferred frequency object group and the less preferred frequency object group has a higher frequency measurement weight than the normal frequency object group. Mathematically, this can be expressed as $W_{preferred} > W_{lesspreferred} > W_{normal}$. Here, $W_{preferred}$ denotes the frequent measurement weight assigned to the frequency objects classified into the preferred frequency object group, $W_{lesspreferred}$ denotes the frequency measurement weight assigned to the frequency objects classified into the less preferred frequency object group, and $W_{normal}$ denotes the frequency measurement weight assigned to the frequency objects classified into the normal frequency object group.

Figure 2:
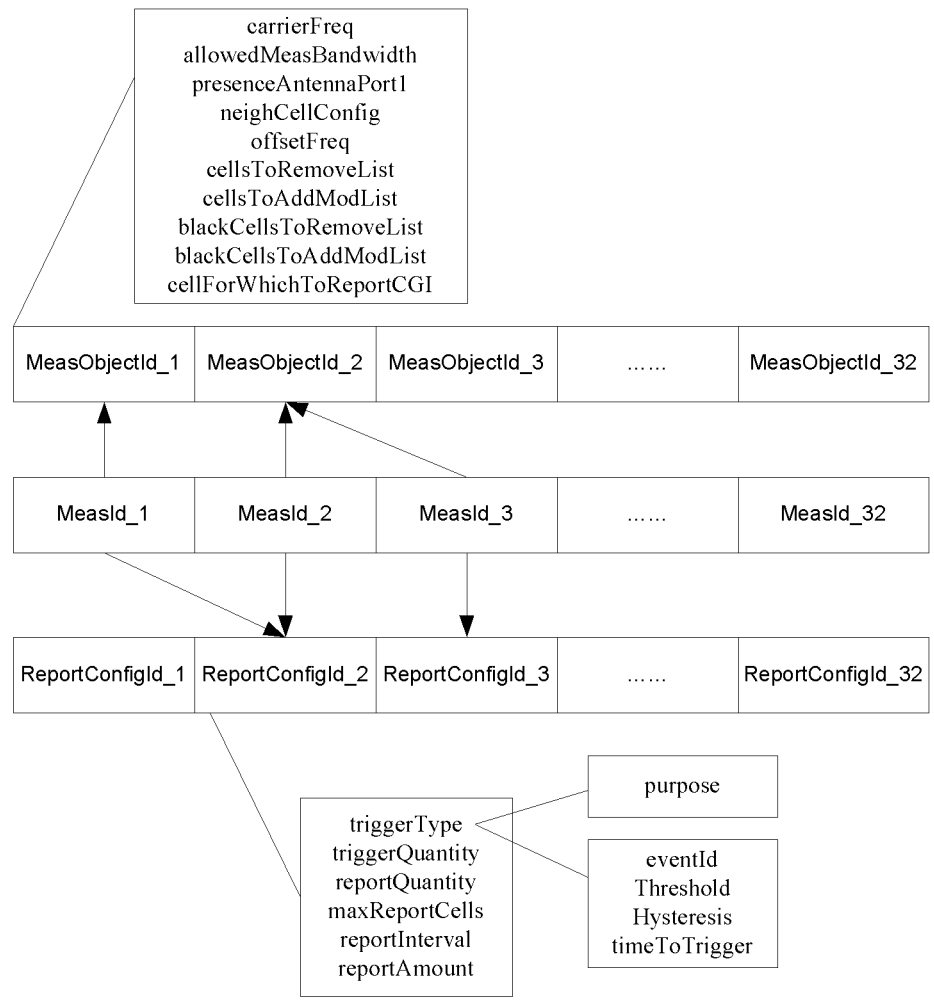
FIG. 2 is a schematic diagram illustrating an example of associations among contents configured for a measurement task.

In practical implementation, a measurement task may refer to a collection of measurements specified by a Radio Resource Control (RRC) measurement configuration message. To illustrate this, FIG. 2 gives an example of associations among contents specified by a RRC measurement configuration message. The collection of measurements referred to by a measurement task are indicated by MeasId_x (x=1 . . . 32) and the frequency/cell objects to be measured for the measurement task are indicated by MeasObjectId_x (x=1 . . . 32).

With the proposed method, it is possible for the RBS to perform intra-task coordination by classifying frequency objects associated with a measurement task into a preferred frequency object group, a less preferred frequency object group and a normal frequency object group according to the task/feature's QoS and/or KPI requirements.

As illustrated in FIG. 1, the method 100 may further comprise step s120, at which the RBS classifies cell objects to be measured on frequency objects belonging to the frequency object group assigned with the highest frequency measurement weight into a number of cell object groups. The cell object groups are given respective cell measurement opportunities. Then, at step s140, a second indication in addition to the previously-mentioned first indication is sent to the terminal device, indicating the classification of the cell objects into the cell object groups.

By way of illustration rather than limitation, the cell object groups may comprise a preferred cell object group and a normal cell object group. The preferred cell object group has a higher cell measurement opportunity than the normal cell object group.

In this manner, it is possible for the RBS to perform intra-task coordination by further classifying cell objects to be measured for the preferred frequency object group of a measurement task into a preferred cell object group and a normal cell object group according to the task/feature's QoS and/or KPI requirements.

Thus, for various measurement tasks that enable different features including but not limited to mobility, Single Radio Voice Call Continuity (SRVCC), Circuit Switch FallBack (CSFB), Automatic Neighbor Relation (ANR), load balance, etc., the RBS can flexibly make appropriate grouping strategies according to the specific QoS and/or KPI requirements of the respective measurement tasks/features. Particularly, if some of the frequency/cell objects are more critical than the other objects for meeting a feature's requirements, the RBS may put the more critical frequency/cell objects into the preferred frequency/cell object group.

For example, for a measurement task enabling the handover feature, the RBS may put the target cell into the preferred cell object group, so that the terminal device may have a higher possibility to perform a successful handover to the target cell and the possibility of ping-pong oscillation handover can be reduced.

By way of illustration rather than limitation, factors that may be taken into account by the RBS for making its grouping strategy may include:
mobility action of cell/frequency;
hit rate evaluation of cell/frequency;
priority of frequency;
roaming strategy between operators;
load balance counter;
priority of Radio Access Technology (RAT);
value of Absolute Radio Frequency Channel Number (ARFCN).

As illustrated in FIG. 1, the method 100 may further comprise step s130, at which the RBS determines that the measurement task preempts one or more old measurement tasks. The frequency object group of the measurement task which is assigned with the highest frequency measurement weight is further assigned with a preemption weight (denoted as $W_{preempt}$) for determining measurement opportunities for the frequency objects of the measurement task and the old measurement tasks. Then, at step s140, a third indication in addition to the previously-mentioned first and second indications is sent to the terminal device, indicating the preemption of the old measurement tasks by the measurement task.

By introducing the preemption scheme, it is possible for the RBS to perform inter-task coordination by providing extra measurement opportunity for the preferred frequency object group of a new measurement task at the cost of reduced measurement opportunities for some of all of frequency object groups of old measurement tasks according to the tasks/features' QoS and/or KPI requirements.

For example, considering that a measurement task enabling the Voice-over-Long Term Evolution (VoLTE) related feature (such as SRVCC, CSFB, etc.) is more time critical (that is, has a more strict requirement for measurement delay) than a measurement task for which measurements are trigged periodically, the RBS may determine that the former measurement task shall preempt the latter measurement task.

Figure 3:
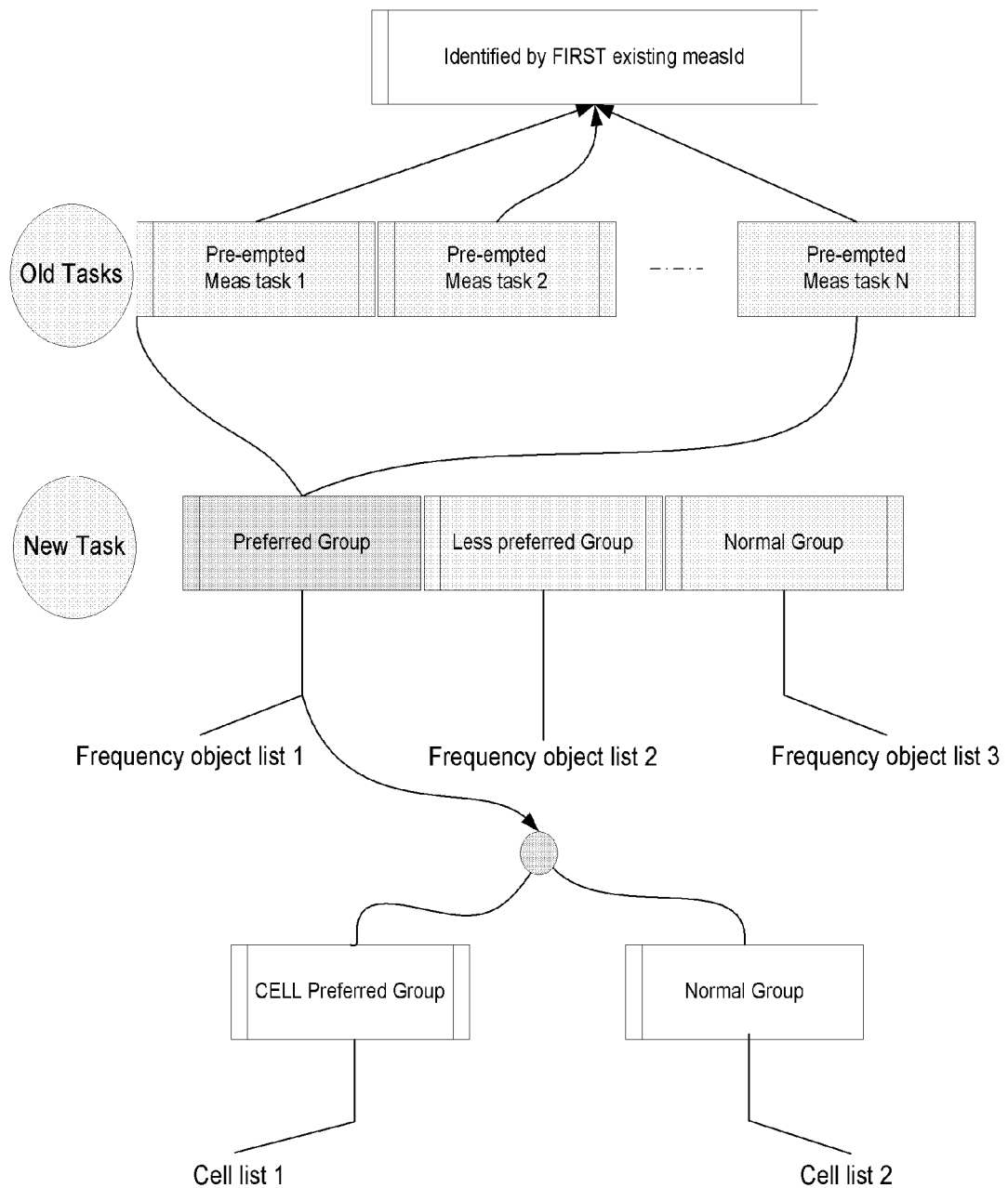
FIG. 3 is a schematic diagram illustrating an example of a new measurement task preempting a number of old measurement tasks.

By way of illustration, FIG. 3 depicts the preemption of several old measurement tasks by a new measurement task. To be specific, frequency objects to be measured for the new measurement task are classified into a preferred frequency object group, a less preferred frequency object group and a normal frequency object group. For the preferred frequency group, associated cell objects are classified into a preferred cell object group and a normal cell group.

It can be learnt from FIG. 3 that the frequency object groups are formed not only for intra-task coordination (namely, determining which frequency objects of a measurement task shall be measured preferentially over the other frequency objects of the measurement task) but also for inter-task coordination (namely, preemption of one or more old measurement tasks by the new measurement task). Specifically, with the frequency objects associated with each of the new measurement task and the old measurement tasks classified into a preferred frequency object group, a less preferred frequency object group and a normal frequency object group, the preferred frequency object group of the new measurement task may preempt the normal frequency object group, the normal and less preferred frequency object groups or the normal, less preferred and preferred frequency object groups of any of the old measurement tasks.

To identify an old measurement task preempted by the new measurement task, the first MeasId in the RRC measurement configuration message corresponding to the old measurement task may be used.

In practical implementation, the first indication, the second indication and/or the third indication may be sent to the terminal device in a measurement configuration for the measurement task.

By way of illustration rather than limitation, an exemplary RRC measurement configuration message is given below, which contains new Information Elements (IEs): measGroupIndicator for conveying the first and the second indications; and PreemptedMeasList. for conveying the third indication.

Figure 4:
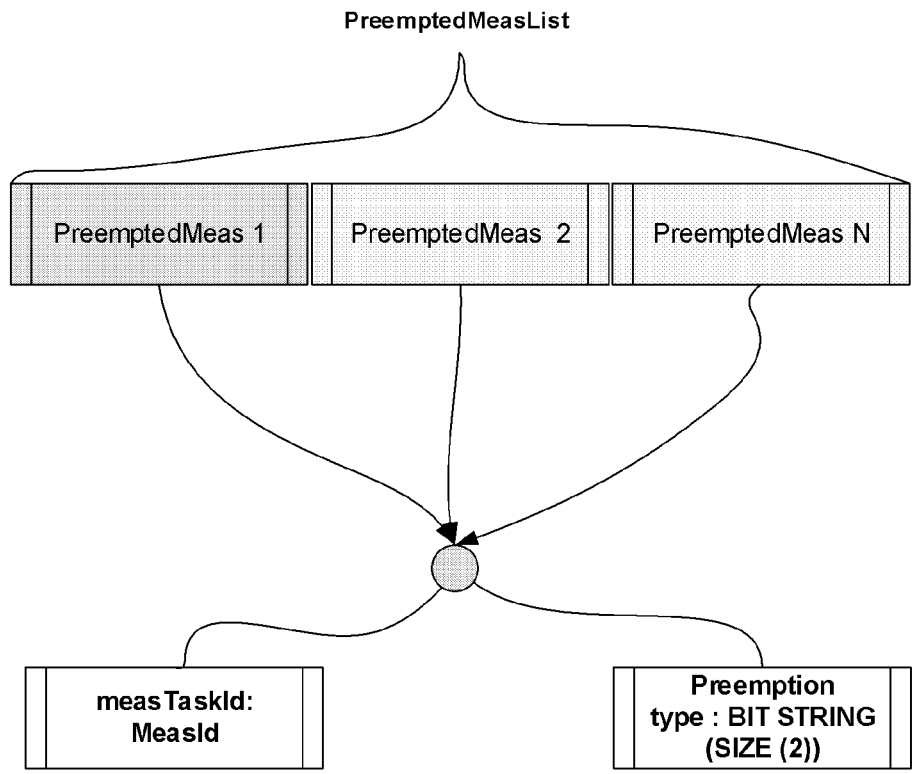
FIG. 4 is a schematic diagram illustrating an information element indicating the preemption of old measurement tasks by a new measurement task.

FIG. 4 illustrates an exemplary data structure of the IE PreemptedMeasList in more detail. To be specific, for each of the preempted old measurement tasks, PreemptedMeasList may consist of a measurement task ID field and a preemption type field. The measurement task ID field identifies the respective preempted old measurement task, and may contain the first MeasId in the RRC measurement configuration message corresponding to the respective preempted old measurement task as mentioned above.

The preemption type field represents the preemption type for the respective preempted old measurement tasks. By way of example, the preemption type field may be a string of two bits that identifies one of three possible preemption types according to the following mappings.

01: the normal frequency object group of the respective preempted old measurement task is preempted by the preferred frequency group of the new measurement task.

10: the normal frequency object group and the less preferred frequency object group of the respective preempted old measurement task are preempted by the preferred frequency group of the new measurement task.

11: the normal frequency object group, the less preferred frequency object group and the preferred frequency object group of the respective old measurement task are preempted by the preferred frequency group of the new measurement task.

Figure 5:
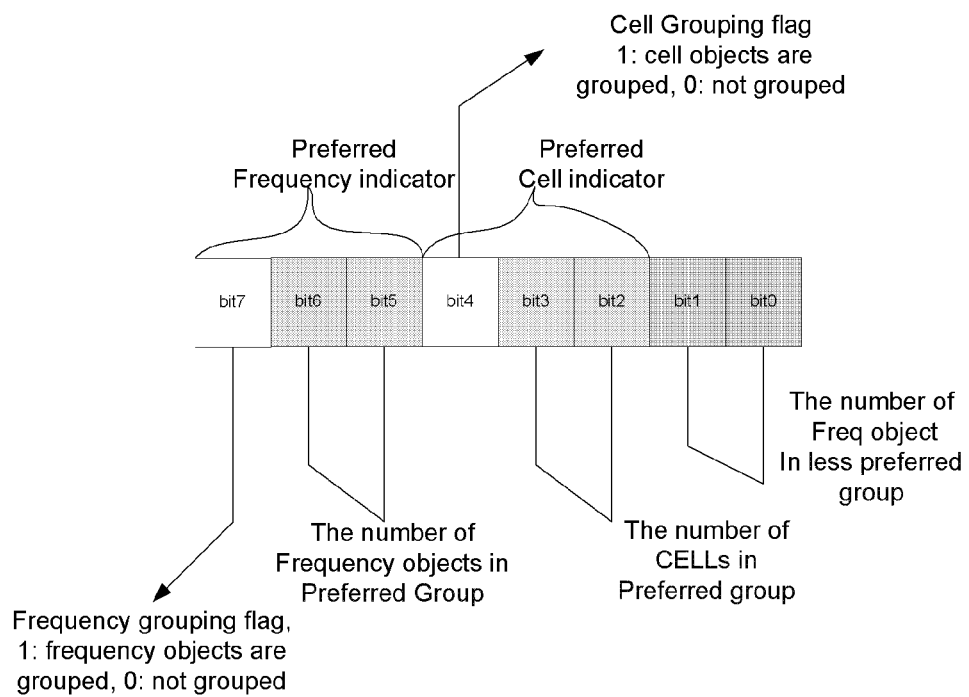
FIG. 5 is a schematic diagram illustrating an information element indicating the grouping of frequency objects and the grouping of cell objects.

The other new IE measGroupIndicator may take the form of a bit string as illustrated in FIG. 5. In practical implementation, 8 bits may be enough to indicate both the

```
-- ASN1START
MeasConfig ::=                 SEQUENCE {
    -- Measurement objects
    measObjectToRemoveList     MeasObjectToRemoveList        OPTIONAL,    -- Need ON
    measObjectToAddModList     MeasObjectToAddModList        OPTIONAL,    -- Need ON
    -- Reporting configurations
    reportConfigToRemoveList   ReportConfigToRemoveList      OPTIONAL,    -- Need ON
    reportConfigToAddModList   ReportConfigToAddModList      OPTIONAL,    -- Need ON
    -- Measurement identities
    measIdToRemoveList         MeasIdToRemoveList            OPTIONAL,    -- Need ON
    measIdToAddModList         MeasIdToAddModList            OPTIONAL,    -- Need ON
    -- Other parameters
    quantityConfig             QuantityConfig                OPTIONAL,    -- Need ON
    measGapConfig              MeasGapConfig                 OPTIONAL,    -- Need ON
    s-Measure                  RSRP-Range                    OPTIONAL,    -- Need ON
    preRegistrationInfoHRPD    PreRegistrationInfoHRPD       OPTIONAL,    -- Need OP
    speedStatePars   CHOICE {
        release                NULL,
        setup                  SEQUENCE {
            mobilityStateParameters    MobilityStateParameters,
            timeToTrigger-SF           SpeedStateScaleFactors
        }
    }                                                        OPTIONAL,    -- Need ON
    ...,
    [[  measObjectToAddModList-v9e0  MeasObjectToAddModList-v9e0   OPTIONAL    -- Need ON
    ]]
    preemptedMeasList              PreemptedMeasList             OPTIONAL,
-- each element of PreemptedMeasIdList is, which means X measID in PreemptedMeasIdList can
indicate X previous MeasConfig.
    measGroupIndicator    BIT STRING (SIZE (8)) OPTIONAL
--1(flag)+2(number freq)+1(flag)+2(number cell); +2(middle freq); other are low
}
PreemptedMeasList  ::=    SEQUENCE (SIZE (1 . .maxMeasId)) OF PreemptedMeas
PreemptedMeas ::=   SEQUENCE {
    measTaskId         MeasId, -- The first measID in the corresponding RRC message with
MeasConfig, which identifies a measurement task.
    action         BIT STRING (SIZE (2))    OPTIONAL -- Absent means all of the measurement
object in the MeasConfig should be pre-empted.
}
MeasIdToRemoveList ::=         SEQUENCE (SIZE (1 . .maxMeasId)) OF MeasId
MeasObjectToRemoveList ::=     SEQUENCE (SIZE (1 . .maxObjectId)) OF MeasObjectId
ReportConfigToRemoveList ::=   SEQUENCE (SIZE (1 . .maxReportConfigId)) OF ReportConfigId
-- ASN1STOP
``` grouping of frequency objects and the grouping of cell objects. Among the 8 bits, bit 7 is used to indicate whether the frequency object grouping is enabled or disabled, and bit 4 is used to indicate whether the cell object grouping is enabled or disabled. In case bit 7 is set to 1 indicating that the frequency object grouping is enabled, bit 6 and bit 5 are used together to indicate a number of frequency objects classified into the preferred frequency object group, and bit 1 and bit 0 are used together to indicate a number of frequency objects classified into the less preferred frequency object group. In case bit 4 is set to 1 indicating that cell object grouping is enabled, bit 3 and bit 2 are used together to indicate a number of cell objects classified into the preferred cell object group.

In case cell object grouping is not supported by the RBS and only the first indication is sent in measGroupIndicator to indicate how the frequency objects are grouped, the length of the bit string may be reduced to 5 bits, among which bit 4 is used to indicate whether the frequency object grouping is enabled or disabled. If bit 4 is set to 1 indicating that the frequency object grouping is enabled, bit 3 and bit 2 are used together to indicate a number of frequency objects classified into the preferred frequency object group, and bit 1 and bit 0 are used together to indicate a number of frequency objects classified into the less preferred frequency object group.

Note that, in this specific implementation, the frequency objects shall be put in the measObjectToAddList of the RRC measurement configuration message in an order of the preferred group, the less preferred group and the normal group of frequency objects and the cell objects shall be put in the measObjectToAddList in an order of the preferred group and the normal group of cell objects, such that it is feasible to indicate the grouping of frequency objects and the grouping of cell objects by simply indicating the number of frequency/cell objects in the preferred frequency/cell object group and the number of frequency objects in the less preferred frequency object group.

Correspondingly to the above-described method 100 in the RBS, a method 600 may be provided in a terminal device for facilitating measurement at the terminal device according to the present disclosure.

Figure 6:
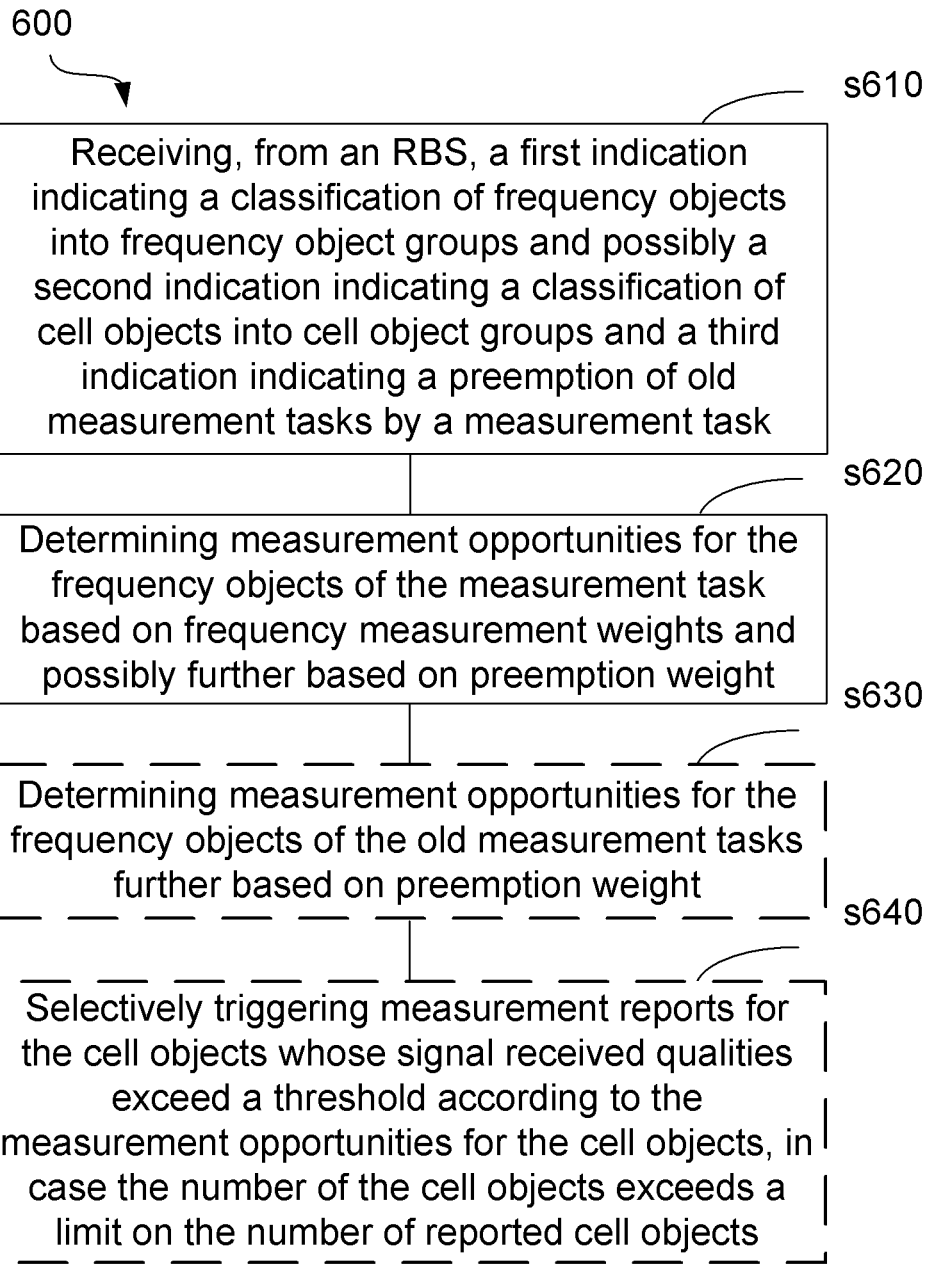
FIGS. 6-9 are flowcharts illustrating operations of a method in a terminal device for facilitating measurement at the terminal device according to the present disclosure.

As illustrated in FIG. 6, the method 600 may comprise a step s610, at which the terminal device receives from an RBS a first indication indicating a classification of frequency objects to be measured for a measurement task into a number of frequency object groups. The frequency object groups are assigned with respective frequency measurement weights.

Then, at step s620, measurement opportunities for the frequency objects of the measurement task are determined based on the frequency measurement weights.

With the proposed method, the terminal device is able to determine measurement opportunities for the frequency objects based on the RBS's grouping strategy made according to task/feature's requirements. As a result, the task/feature's requirements can be better satisfied and the usage efficiency of measurement resources can be improved.

In an embodiment, at step s610, the terminal device may receive from the RBS a second indication in addition to the first indication, indicating a classification of cell objects to be measured on frequency objects belonging to the frequency object group assigned with the highest frequency measurement weight into a number of cell object groups. The cell object groups are given respective cell measurement opportunities.

As exemplified above with respect to the method 100 implemented in the RBS, the frequency object groups may comprise a preferred frequency object group, a less preferred frequency object group and a normal frequency object group. The cell object groups may comprise a preferred cell object group and a normal cell object group.

In an embodiment, the method 600 may further comprise step s640, at which measurement reports for the cell objects whose signal received qualities, such as Reference Signal Received Powers (RSRPs) or Reference Signal Received Qualities (RSRQs), exceed a threshold are selectively triggered according to the cell measurement opportunities for the cell objects, in case the number of the cell objects exceeds a limit on the number of reported cell objects which is for example specified by maxCellReport in 3GPP TS36.111.

In this manner, in case there is inadequate radio resource for reporting all cell objects to be measured on frequency objects belonging to the preferred frequency object group, it can be ensured that the cell objects classified into the preferred cell object group are reported preferentially over the cell objects classified into the normal cell object group if their signal received qualities (such as RSRPs or RSRQs) are high enough.

In an embodiment, at step s610, the terminal device may receive from the RBS a third indication in addition to the first and second indications, indicating a preemption of one or more frequency object groups of one or more old measurement tasks by the frequency object group of the measurement task which is assigned with the highest frequency measurement weight. The frequency object group of the measurement task is further assigned with a preemption weight.

Accordingly, the measurement opportunities for the frequency objects of the measurement task are determined further based on the preemption weight at step s620.

Figure 7:
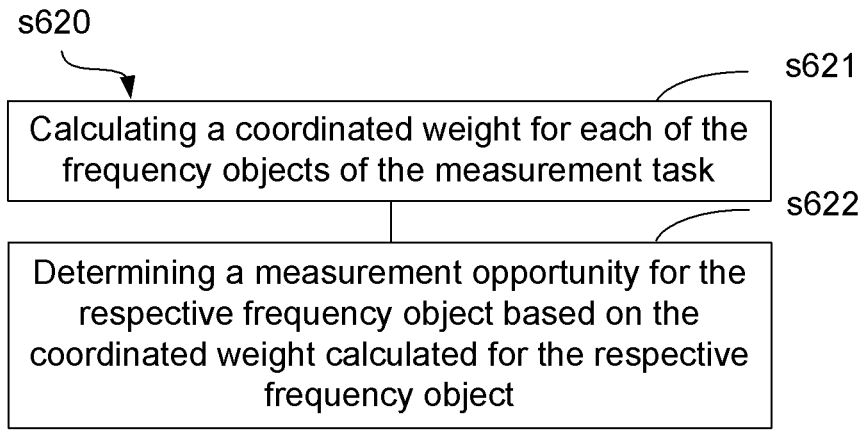

By way of example, step s620 may comprise steps s621 and s622 as illustrated in FIG. 7. At step s621, a coordinated weight for each of the frequency objects of the measurement task (denoted as $W_{coord}$) is calculated. At step s622, a measurement opportunity for the respective frequency object is determined based on the coordinated weight calculated for the respective frequency object.

Figure 8:
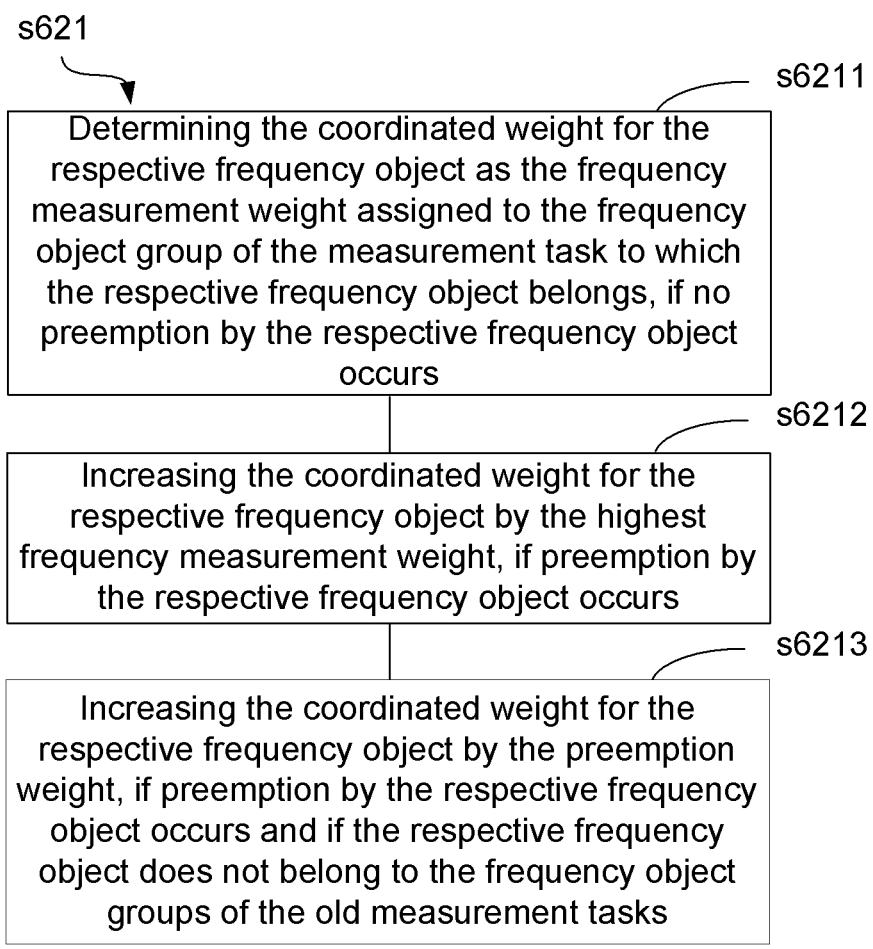

As illustrated in FIG. 8, step s621 may comprise steps s6211-s6213. At step s6211, the coordinated weight for the respective frequency object is determined as the frequency measurement weight assigned to the frequency object group of the measurement task to which the respective frequency object belongs, if no preemption by the respective frequency object occurs. That is, in case the respective frequency object belongs to the less preferred frequency object group or the normal frequency object group of the measurement task that preempts one or more old measurement tasks, the coordinated weight $W_{coord}$ for the respective frequency object is determined as $W_{lesspreferred}$ or $W_{normal}$ accordingly.

At step s6212, the coordinated weight for the respective frequency object is increased by the highest frequency measurement weight, if preemption by the respective frequency object occurs. That is, in case the respective frequency object belongs to the preferred frequency object group of the measurement task that preempts one or more old measurement tasks, the current coordinated weight for the respective frequency object $W_{coord}$ is determined as the previous coordinated weight for the respective frequency object $W'_{coord}$ plus $W_{preferred}$.

At step s6213, the coordinated weight for the respective frequency object is increased by the preemption weight, if preemption by the respective frequency object occurs and if the respective frequency object does not belong to the frequency object groups of the old measurement tasks. That is, in case the respective frequency object does not preempt itself, $W_{preempt}$ is further added to the current coordinated weight for the respective frequency object $W_{coord}$.

As a summary of steps s6212 and s6213, if the preemption is not a self-preemption, $W_{coord}=W'_{coord}+W_{preferred}+W_{preempt}$. Otherwise, if the preemption is a self-preemption, $W_{coord}=W'_{coord}+W_{preferred}$.

Referring back to FIG. 1, the method 600 may further comprise step s630, at which measurement opportunities for the frequency objects of the old measurement tasks are determined further based on the preemption weight.

Figure 9:
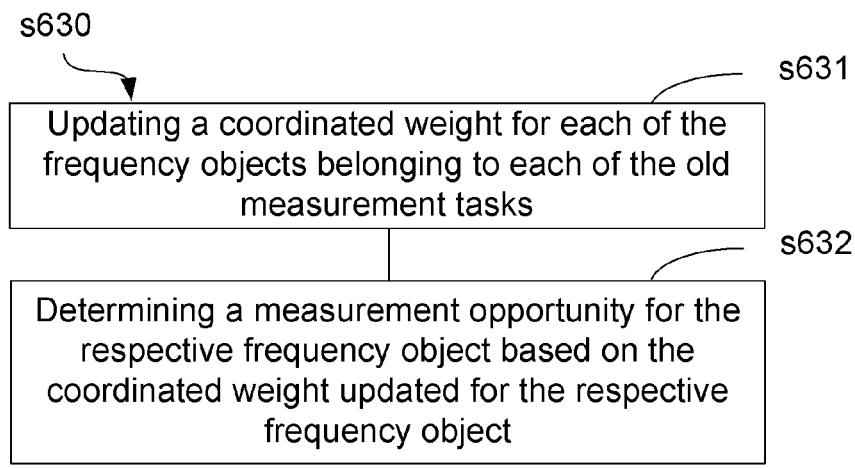

By way of example, step s630 may comprise steps s631 and s632 as illustrated in FIG. 9. At step s631, a coordinated weight for each of the frequency objects that belong to each of the old measurement tasks (denoted as $W_{coord}$) is updated.

Specifically, the coordinated weight for the respective frequency object is decreased by the preemption weight, if the respective frequency object is preempted and if the respective frequency object does not belong to the frequency object group of the measurement task assigned with the highest frequency measurement weight. The coordinated weight for the respective frequency object has been determined as the frequency measurement weight assigned to the frequency object group of the respective old measurement task to which the respective frequency object belongs, if no preemption by the respective frequency object had occurred and the respective frequency object had not been preempted. Mathematically, if the preemption is not a self-preemption, $W_{coord}=W'_{coord}-W_{preempt}$. Otherwise, if the preemption is a self-preemption or if the respective frequency object is not preempted, $W_{coord}=W'_{coord}$. Here, $W_{coord}$ denotes the updated coordinated weight for the respective frequency object, $W'_{coord}$ denotes the previous coordinated weight for the respective frequency object and $W_{preempt}$ denotes the preemption weight.

At step s632, a measurement opportunity for the respective frequency object is determined based on the coordinated weight updated for the respective frequency object.

In practical implementation, the terminal device may perform steps s620 and s630 by referring to the above-described IEs measGroupIndicator and PreemptedMeasList contained in an RRC measurement configuration message specifying a measurement task, whenever the RRC measurement configuration message is received from the RBS. If PreemptedMeasList indicates that no preemption occurs, the coordinated weight for each of frequency objects of the measurement task is determined as $W_{preferred}$, $W_{lesspreferred}$ or $W_{normal}$ according to which of the frequency object groups the respective frequency object belongs to. If PreemptedMeasList indicates that preemption occurs, the coordinated weights for the frequency objects of the measurement task and the preempted old measurement tasks are determined from $W'_{coord}$, $W_{preempt}$, $W_{preferred}$, $W_{lesspreferred}$ and $W_{normal}$ according to the above-described steps s621 and s631.

For legacy terminal devices which cannot perform the above-described method 600, they can simply ignore the IEs measGroupIndicator and PreemptedMeasList newly introduced in the RRC measurement configuration message and determine the measurement opportunities for the frequency objects by themselves as in the prior art. That is, the proposed method 100 allows for backward compatibility.

As an enhancement, the measurement opportunities for the frequency objects may be determined further based on time spans during which the frequency objects have not been measured, respectively.

In practical implementation, this can be achieved by determining an overall frequency measurement weight for a frequency object based on both the coordinated weight for the frequency object and the time span during which the frequency object has not been measured and then determining the measurement opportunity for the frequency object based on the overall frequency measurement weight.

In an embodiment, the overall frequency measurement weight may be determined as follows $$W_{obj}=\alpha*W_{coord}+(1-\alpha)*W_{delay}$$

where $W_{obj}$ denotes the overall frequency measurement weight for the frequency object, $W_{coord}$ denotes the coordinated weight for the frequency object, $W_{delay}$ denotes a weight characterizing the time delay counted since the last time the frequency object was measured and α denotes the percentage of the $W_{obj}$ for which $W_{coord}$ accounts.

In the following, structures of an RBS 1000 and a terminal device 1100 according to the present disclosure will be described with reference to FIGS. 10 and 11. The RBS 1000 and the terminal device 1100 correspond to the above methods 100 and 600, respectively.

Figure 10:
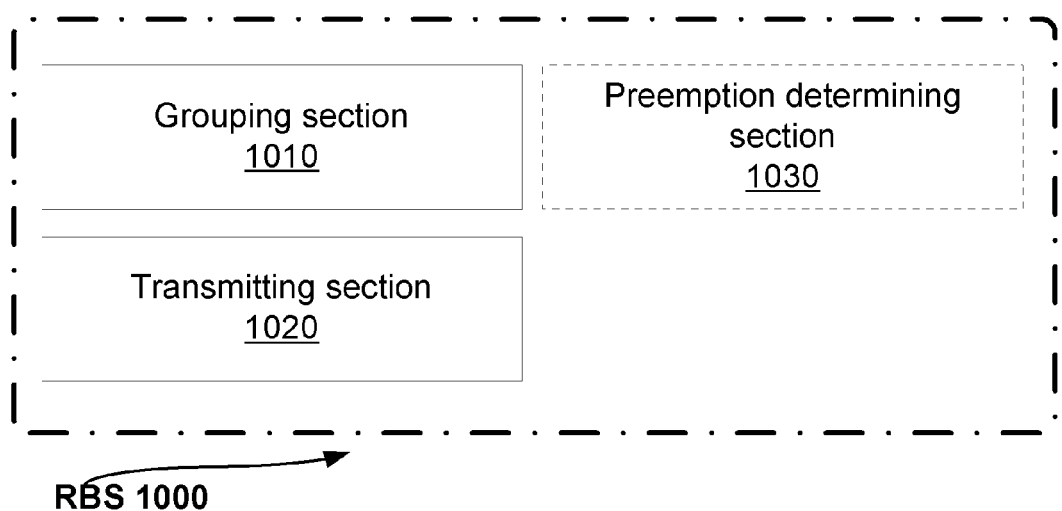
FIG. 10 is a block diagram illustrating a structure of an RBS according to the present disclosure.

As illustrated in FIG. 10, the RBS 1000 comprises a grouping section 1010 and a transmitting section 1020. The grouping section 1010 is configured to classify frequency objects to be measured for a measurement task into a number of frequency object groups. The frequency object groups are assigned with respective frequency measurement weights for determining measurement opportunities for the frequency objects. The transmitting section 1020 is configured to send to the terminal device a first indication indicating the classification of the frequency objects into the frequency object groups.

In an embodiment, the grouping section 1010 may be further configured to classify cell objects to be measured on frequency objects belonging to the frequency object group assigned with the highest frequency measurement weight into a number of cell object groups. The cell object groups are given respective cell measurement opportunities. The transmitting section 1020 may be further configured to send to the terminal device a second indication indicating the classification of the cell objects into the cell object groups.

In an embodiment, the RBS 1000 may further comprise a preemption determining section 1030, which is configured to determine that the measurement task preempts one or more old measurement tasks. The frequency object group of the measurement task which is assigned with the highest frequency measurement weight is further assigned with a preemption weight for determining measurement opportunities for the frequency objects of the measurement task and the old measurement tasks. The transmitting section 1020 may be further configured to send to the terminal device a third indication indicating the preemption of the old measurement tasks by the measurement task.

In an embodiment, the transmitting section 1020 may be configured to send the first indication, the second indication and/or the third indication to the terminal device in a measurement configuration for the measurement task.

In an embodiment, the frequency object groups may comprise a preferred frequency object group, a less preferred frequency object group and a normal frequency object group. The preferred frequency object group has a higher frequency measurement weight than the less preferred frequency object group, and the less preferred frequency object group has a higher frequency measurement weight than the normal frequency object group. The cell object groups may comprise a preferred cell object group and a normal cell object group. The preferred cell object group has a higher cell measurement opportunity than the normal cell object group.

In an embodiment, the first indication and the second indication together may constitute an information element consisting of:
- a one-bit flag that represents whether the frequency objects are classified into frequency object groups,
- a two-bit field that represents a number of frequency objects classified into the preferred frequency object group,
- a one-bit flag that represents whether the cell objects are classified into cell object groups,
- a two-bit field that represents a number of cell objects classified into the preferred cell object group, and
- a two-bit field that represents a number of frequency objects classified into the less preferred frequency object group.

In an embodiment, the third indication may be an information element consisting of: for each of the preempted old measurement tasks, a measurement task ID field and a preemption type field. The measurement task ID field identifies the respective preempted old measurement task. The preemption type field represents one of the following preemption types for the respective preempted old measurement task:
- the normal frequency object group of the respective preempted old measurement task is preempted by the preferred frequency group of the measurement task,
- the normal frequency object group and the less preferred frequency object group of the respective preempted old measurements task are preempted by the preferred frequency group of the measurement task, or
- the normal frequency object group, the less preferred frequency object group and the preferred frequency object group of the respective old measurement task are preempted by the preferred frequency group of the measurement task.

As those skilled in the art will appreciate, the above-described sections of the RBS 1000 may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the RBS may comprise a memory, a processor (including but not limited to a microprocessor, a microcontroller or a Digital Signal Processor (DSP), etc.) and a transceiver. The memory stores machine-readable program code executable by the processor to cause the RBS to perform the above-described method 100.

Figure 11:
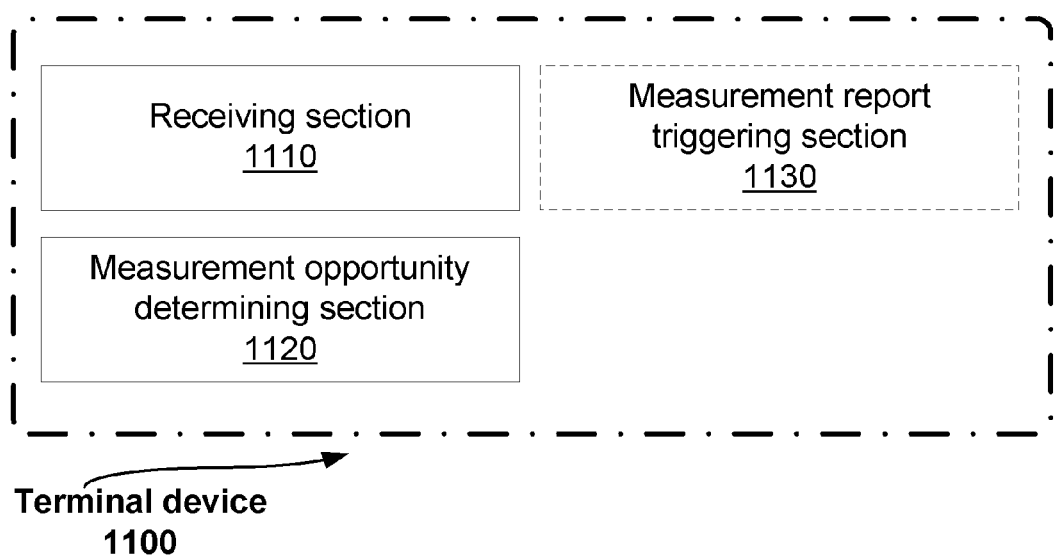
FIG. 11 is a block diagram illustrating a structure of a terminal device according to the present disclosure.

As illustrated in FIG. 11, the terminal device 1100 comprises a receiving section 1110 and a measurement opportunity determining section 1120. The receiving section 1110 is configured to receive, from an RBS, a first indication indicating a classification of frequency objects to be measured for a measurement task into a number of frequency object groups. The frequency object groups are assigned with respective frequency measurement weights. The measurement opportunity determining section 1120 is configured to determine measurement opportunities for the frequency objects of the measurement task based on the frequency measurement weights.

In an embodiment, the receiving section 1110 may be further configured to receive from the RBS a second indication indicating a classification of cell objects to be measured on frequency objects belonging to the frequency object group assigned with the highest frequency measurement weight into a number of cell object groups. The cell object groups are given respective cell measurement opportunities.

In an embodiment, the terminal device 1100 may further comprise a measurement report triggering section 1130. The measurement report triggering section 1130 may be configured to selectively trigger measurement reports for the cell objects whose signal received qualities exceed a threshold according to the cell measurement opportunities for the cell objects, in case the number of the cell objects exceeds a limit on the number of reported cell objects.

In an embodiment, the receiving section 1110 may be further configured to receive from the RBS a third indication indicating a preemption of one or more frequency object groups of one or more old measurement tasks by the frequency object group of the measurement task which is assigned with the highest frequency measurement weight. The frequency object group of the measurement task is further assigned with a preemption weight. The measurement opportunity determining section 1120 may be configured to determine the measurement opportunities for the frequency objects of the measurement task further based on the preemption weight.

In an embodiment, the receiving section 1120 may be configured to receive the first indication, the second indication and/or the third indication to the RBS in a measurement configuration for the measurement task.

In an embodiment, the measurement opportunity determining section 1120 may be configured to calculate a coordinated weight for each of the frequency objects and to determine a measurement opportunity for the respective frequency object based on the coordinated weight calculated for the respective frequency object. The coordinated weight for the respective frequency object may be calculated by: determining the coordinated weight for the respective frequency object as the frequency measurement weight assigned to the frequency object group of the measurement task to which the respective frequency object belongs, if no preemption by the respective frequency object occurs; increasing the coordinated weight for the respective frequency object by the highest frequency measurement weight, if preemption by the respective frequency object occurs; and increasing the coordinated weight for the respective frequency object by the preemption weight, if preemption by the respective frequency object occurs and if the respective frequency object does not belong to the frequency object groups of the old measurement tasks.

In an embodiment, the measurement opportunity determining section 1120 may be further configured to determine measurement opportunities for the frequency objects of the old measurement tasks further based on the preemption weight.

Specifically, the measurement opportunity determining section 1120 may be configured to update a coordinated weight for each of the frequency objects that belong to each of the old measurement tasks and to determine a measurement opportunity for the respective frequency object based on the coordinated weight updated for the respective frequency object. The coordinated weight for the respective frequency object is updated by decreasing the coordinated weight for the respective frequency object by the preemption weight, if the respective frequency object is preempted and if the respective frequency object does not belong to said frequency object group of the measurement task assigned with the highest frequency measurement weight. The coordinated weight for the respective frequency object has been determined as the frequency measurement weight assigned to the frequency object group of the respective old measurement task to which the respective frequency object belongs, if no preemption by the respective frequency object had occurred and the respective frequency object had not been preempted.

In an embodiment, the measurement opportunity determining section 1120 may be configured to determine the measurement opportunities for the frequency objects further based on time spans during which the frequency objects have not been measured, respectively.

As those skilled in the art will appreciate, the above-described sections of the terminal device 1100 may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the terminal device may comprise a memory, a processor (including but not limited to a microprocessor, a microcontroller or a Digital Signal Processor (DSP), etc.) and a transceiver. The memory stores machine-readable program code executable by the processor to cause the terminal device to perform the above-described method 600.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method in a Radio Base Station (RBS) for facilitating measurement at a terminal device, the method comprising:
classifying frequency objects to be measured for a measurement task into a number of frequency object groups, wherein the frequency object groups are assigned with respective frequency measurement weights for determining measurement opportunities for the frequency objects; and
sending to the terminal device a first indication indicating the classification of the frequency objects into the frequency object groups.

2. The method of claim 1, further comprising:
classifying cell objects to be measured on frequency objects belonging to the frequency object group assigned with the highest frequency measurement weight into a number of cell object groups, wherein the cell object groups are given respective cell measurement opportunities; and
sending to the terminal device a second indication indicating the classification of the cell objects into the cell object groups.

3. The method of claim 1, further comprising:
determining that the measurement task preempts one or more old measurement tasks, wherein the frequency object group of the measurement task which is assigned with the highest frequency measurement weight is further assigned with a preemption weight for determining the measurement opportunities for the frequency objects of the measurement task and the old measurement tasks; and sending to the terminal device a third indication indicating the preemption of the old measurement tasks by the measurement task.

4. The method of claim 3, wherein
the first indication, the second indication and/or the third indication are sent to the terminal device in a measurement configuration for the measurement task.

5. The method of claim 3, wherein
the frequency object groups comprise a preferred frequency object group, a less preferred frequency object group and a normal frequency object group, the preferred frequency object group having a higher frequency measurement weight than the less preferred frequency object group and the less preferred frequency object group having a higher frequency measurement weight than the normal frequency object group, and
the cell object groups comprise a preferred cell object group and a normal cell object group, the preferred cell object group having a higher cell measurement opportunity than the normal cell object group.

6. The method of claim 5, wherein the first indication and the second indication together constitute an information element consisting of:
a one-bit flag that represents whether the frequency objects are classified into the frequency object groups,
a two-bit field that represents a number of frequency objects classified into the preferred frequency object group,
a one-bit flag that represents whether the cell objects are classified into the cell object groups,
a two-bit field that represents a number of cell objects classified into the preferred cell object group, and
a two-bit field that represents a number of frequency objects classified into the less preferred frequency object group.

7. The method of claim 5, wherein the third indication is an information element consisting of: for each of the preempted old measurement tasks,
a measurement task ID field that identifies said each of the preempted old measurement tasks; and
a preemption type field that represents one of the following preemption types for said each of the preempted old measurement tasks:
the normal frequency object group of said each of the preempted old measurement tasks is preempted by the preferred frequency group of the measurement task,
the normal frequency object group and the less preferred frequency object group of said each of the preempted old measurements tasks are preempted by the preferred frequency group of the measurement task, or
the normal frequency object group, the less preferred frequency object group and the preferred frequency object group of said each of the old measurement tasks are preempted by the preferred frequency group of the measurement task.

8. A method in a terminal device for facilitating measurement at the terminal device, the method comprising:
receiving from a Radio Base Station (RBS), a first indication indicating a classification of frequency objects to be measured for a measurement task into a number of frequency object groups, wherein the frequency object groups are assigned with respective frequency measurement weights; and determining measurement opportunities for the frequency objects of the measurement task based on the frequency measurement weights.

9. The method of claim 8, further comprising:
receiving from the RBS a second indication indicating a classification of cell objects to be measured on frequency objects belonging to the frequency object group assigned with the highest frequency measurement weight into a number of cell object groups, the cell object groups being given respective cell measurement opportunities.

10. The method of claim 9, further comprising:
selectively triggering measurement reports for the cell objects whose signal received qualities exceed a threshold according to the cell measurement opportunities for the cell objects, in case the number of the cell objects exceeds a limit on the number of reported cell objects.

11. The method of claim 9, further comprising:
receiving from the RBS a third indication indicating a preemption of one or more frequency object groups of one or more old measurement tasks by the frequency object group of the measurement task which is assigned with the highest frequency measurement weight, wherein the frequency object group of the measurement task is further assigned with a preemption weight, and
wherein the measurement opportunities for the frequency objects of the measurement task are determined further based on the preemption weight.

12. The method of claim 11, wherein
the first indication, the second indication and/or the third indication are received from the RBS in a measurement configuration for the measurement task.

13. The method of claim 11, wherein the determining the measurement opportunities for the frequency objects of the measurement task comprises:
calculating a coordinated weight for each of the frequency objects by:
determining the coordinated weight for said each of the frequency objects as the frequency measurement weight assigned to the frequency object group of the measurement task to which said each of the frequency objects belongs, if no preemption by said each of the frequency objects occurs;
increasing the coordinated weight for said each of the frequency objects by the highest frequency measurement weight, if preemption by said each of the frequency objects occurs; and
increasing the coordinated weight for said each of the frequency objects by the preemption weight, if preemption by said each of the frequency objects occurs and if said each of the frequency objects does not belong to said frequency object groups of the old measurement tasks, and
determining a measurement opportunity for said each of the frequency objects based on the coordinated weight calculated for said each of the frequency objects.

14. The method of claim 13, further comprising:
determining measurement opportunities for the frequency objects of the old measurement tasks further based on the preemption weight.

15. The method of claim 14, wherein the determining measurement opportunities for the frequency objects of the old measurement tasks comprises:
updating a coordinated weight for each of the frequency objects that belong to each of the old measurement tasks by:
decreasing the coordinated weight for said each of the frequency objects by the preemption weight, if said each of the frequency objects is preempted and if said each of the frequency objects does not belong to said frequency object group of the measurement task assigned with the highest frequency measurement weight,
wherein the coordinated weight for said each of the frequency objects has been determined as the frequency measurement weight assigned to the frequency object group of said each of the old measurement tasks to which said each of the frequency objects belongs, if no preemption by said each of the frequency objects had occurred and said each of the frequency objects had not been preempted, and
determining a measurement opportunity for said each of frequency objects based on the coordinated weight updated for said each of the frequency objects.

16. The method of claim 8, wherein
the measurement opportunities for the frequency objects are determined further based on time spans during which the frequency objects have not been measured, respectively.

17. A Radio Base Station (RBS), comprising:
a grouping section including a circuit configured to classify frequency objects to be measured for a measurement task into a number of frequency object groups, wherein the frequency object groups are assigned with respective frequency measurement weights for determining measurement opportunities for the frequency objects; and
a transmitting section including a circuit, connected with the grouping section, configured to send to the terminal device a first indication indicating the classification of the frequency objects into the frequency object groups.

18. The RBS of claim 17, wherein
the grouping section is further configured to classify cell objects to be measured on frequency objects belonging to the frequency object group assigned with the highest frequency measurement weight into a number of cell object groups, wherein the cell object groups are given respective cell measurement opportunities, and
the transmitting section is further configured to send to the terminal device a second indication indicating the classification of the cell objects into the cell object groups.

19. The RBS of claim 17, further comprising:
a preemption determining section including a circuit configured to determine that the measurement task preempts one or more old measurement tasks, wherein the frequency object group of the measurement task which is assigned with the highest frequency measurement weight is further assigned with a preemption weight for determining measurement opportunities for the frequency objects of the measurement task and the old measurement tasks,
wherein the transmitting section is further configured to send to the terminal device a third indication indicating the preemption of the old measurement tasks by the measurement task.

20. The RBS, wherein
the transmitting section is configured to send the first indication, the second indication and/or the third indication to the terminal device in a measurement configuration for the measurement task.

21. The RBS of claim 19, wherein
the frequency object groups comprise a preferred frequency object group, a less preferred frequency object group and a normal frequency object group, the preferred frequency object group having a higher frequency measurement weight than the less preferred frequency object group and the less preferred frequency object group having a higher frequency measurement weight than the normal frequency object group, and the cell object groups comprise a preferred cell object group and a normal cell object group, the preferred cell object group having a higher cell measurement opportunity than the normal cell object group.

22. The RBS of claim 21, wherein the first indication and the second indication together constitute an information element consisting of:
- a one-bit flag that represents whether the frequency objects are classified into the frequency object groups,
- a two-bit field that represents a number of frequency objects classified into the preferred frequency object group,
- a one-bit flag that represents whether the cell objects are classified into the cell object groups,
- a two-bit field that represents a number of cell objects classified into the preferred cell object group, and
- a two-bit field that represents a number of frequency objects classified into the less preferred frequency object group.

23. The RBS of claim 21, wherein the third indication is an information element consisting of: for each of the preempted old measurement tasks,
- a measurement task ID field that identifies said each of the preempted old measurement tasks; and
- a preemption type field that represents one of the following preemption types for said each of the preempted old measurement tasks:
  - the normal frequency object group of said each of the preempted old measurement tasks is preempted by the preferred frequency group of the measurement task,
  - the normal frequency object group and the less preferred frequency object group of said each of the preempted old measurements tasks are preempted by the preferred frequency group of the measurement task, or
  - the normal frequency object group, the less preferred frequency object group and the preferred frequency object group of said each of the old measurement tasks are preempted by the preferred frequency group of the measurement task.

24. A terminal device, comprising:
- a receiving section including a circuit configured to receive, from a Radio Base Station (RBS), a first indication indicating a classification of frequency objects to be measured for a measurement task into a number of frequency object groups, wherein the frequency object groups are assigned with respective frequency measurement weights; and
- a measurement opportunity determining section including a circuit, connected with the receiving section, configured to determine measurement opportunities for the frequency objects of the measurement task based on the frequency measurement weights.

25. The terminal device of claim 24, wherein
the receiving section is further configured to receive from the RBS a second indication indicating a classification of cell objects to be measured on frequency objects belonging to the frequency object group assigned with the highest frequency measurement weight into a number of cell object groups, the cell object groups being given respective cell measurement opportunities.

26. The terminal device of claim 25, further comprising:
a measurement report triggering section including a circuit configured to selectively trigger measurement reports for the cell objects whose signal received qualities exceed a threshold according to the cell measurement opportunities for the cell objects, in case the number of the cell objects exceeds a limit on the number of reported cell objects.

27. The terminal device of claim 24, wherein
the receiving section is further configured to receive from the RBS a third indication indicating a preemption of one or more frequency object groups of one or more old measurement tasks by the frequency object group of the measurement task which is assigned with the highest frequency measurement weight, wherein the frequency object group of the measurement task is further assigned with a preemption weight, and
the measurement opportunity determining section is configured to determine the measurement opportunities for the frequency objects of the measurement task further based on the preemption weight.

28. The terminal device of claim 27, wherein
the receiving section is configured to receive the first indication, the second indication and/or the third indication to the RBS in a measurement configuration for the measurement task.

29. The terminal device of claim 27, wherein the measurement opportunity determining section is configured to:
calculate a coordinated weight for each of the frequency objects by:
- determining the coordinated weight for said each of the frequency objects as the frequency measurement weight assigned to the frequency object group of the measurement task to which said each of the frequency objects belongs, if no preemption by said each of the frequency objects occurs;
- increasing the coordinated weight for said each of the frequency objects by the highest frequency measurement weight, if preemption by said each of the frequency objects occurs; and
- increasing the coordinated weight for said each of the frequency objects by the preemption weight, if preemption by said each of the frequency objects occurs and if said each of the frequency objects does not belong to said frequency object groups of the old measurement tasks, and
determine a measurement opportunity for said each of the frequency objects based on the coordinated weight calculated for said each of the frequency objects.

30. The terminal device of claim 29, wherein
the measurement opportunity determining section is further configured to determine measurement opportunities for the frequency objects of the old measurement tasks further based on the preemption weight.

31. The terminal device of claim 30, wherein the measurement opportunity determining section is configured to
update a coordinated weight for each of the frequency objects that belong to each of the old measurement tasks by:
decreasing the coordinated weight for said each of the frequency objects by the preemption weight, if said each of the frequency objects is preempted and if said each of the frequency objects does not belong to said frequency object group of the measurement task assigned with the highest frequency measurement weight, wherein the coordinated weight for said each of the frequency objects has been determined as the frequency measurement weight assigned to the frequency object group of said each of the old measurement tasks to which said each of the frequency objects belongs, if no preemption by said each of the frequency objects had occurred and said each of the frequency objects had not been preempted, and determine a measurement opportunity for said each of frequency objects based on the coordinated weight updated for said each of the frequency objects.

32. The terminal device of claim 24, wherein the measurement opportunity determining section is configured to determine the measurement opportunities for the frequency objects further based on time spans during which the frequency objects have not been measured, respectively.

33. A Radio Base Station (RBC) comprising:

a processor; and a memory with machine-readable program code stored therein, which when executed by the processor cause the processor to perform the following:

classifying frequency objects to be measured for a measurement task into a number of frequency object groups, wherein the frequency object groups are assigned with respective frequency measurement weights for determining measurement opportunities for the frequency objects, and sending to the terminal device a first indication indicating the classification of the frequency objects into the frequency object groups.

34. A terminal device comprising:

a processor; and a memory with machine-readable program code stored therein, which when executed by the processor cause the processor to perform the following:

receiving, from a Radio Base Station (RBS), a first indication indicating a classification of frequency objects to be measured for a measurement task into a number of frequency object groups, wherein the frequency object groups are assigned with respective frequency measurement weights, and determining measurement opportunities for the frequency objects of the measurement task based on the frequency measurement weights.

* * * * *

UNITED STATES PATENT AND TRADEMARK OFFICE
CERTIFICATE OF CORRECTION

PATENT NO. : 9,590,748 B2
APPLICATION NO. : 14/430165
DATED : March 7, 2017
INVENTOR(S) : Yao et al.

It is certified that error appears in the above-identified patent and that said Letters Patent is hereby corrected as shown below:

In the Specification

Column 1, Line 46, delete "Index" and insert -- Indicator --, therefor.

Column 5, Line 41, delete "MeasId" and insert -- MeasId --, therefor.

Column 7, Line 28, delete "PreemptedMeasList." and insert -- PreemptedMeasList --, therefor.

Column 7, Table 1, Line 13, delete "Need OP" and insert -- Need ON --, therefor.

Column 7, Table 1, Line 21, delete "OPTIONAL" and insert -- OPTIONAL, --, therefor.

In the Claims

Column 16, Line 40, Claim 7, delete "tasks," and insert -- tasks; --, therefor.

Column 17, Line 54, Claim 7, delete "tasks, and" and insert -- tasks; and --, therefor.

Column 18, Line 24, Claim 17, delete "(RBS)," and insert -- (RBS) --, therefor.

Column 20, Line 50, Claim 29, delete "tasks, and" and insert -- tasks; and --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*